H. W. WEBB.
THERMO-ELECTRIC GENERATOR.
APPLICATION FILED MAY 17, 1913.

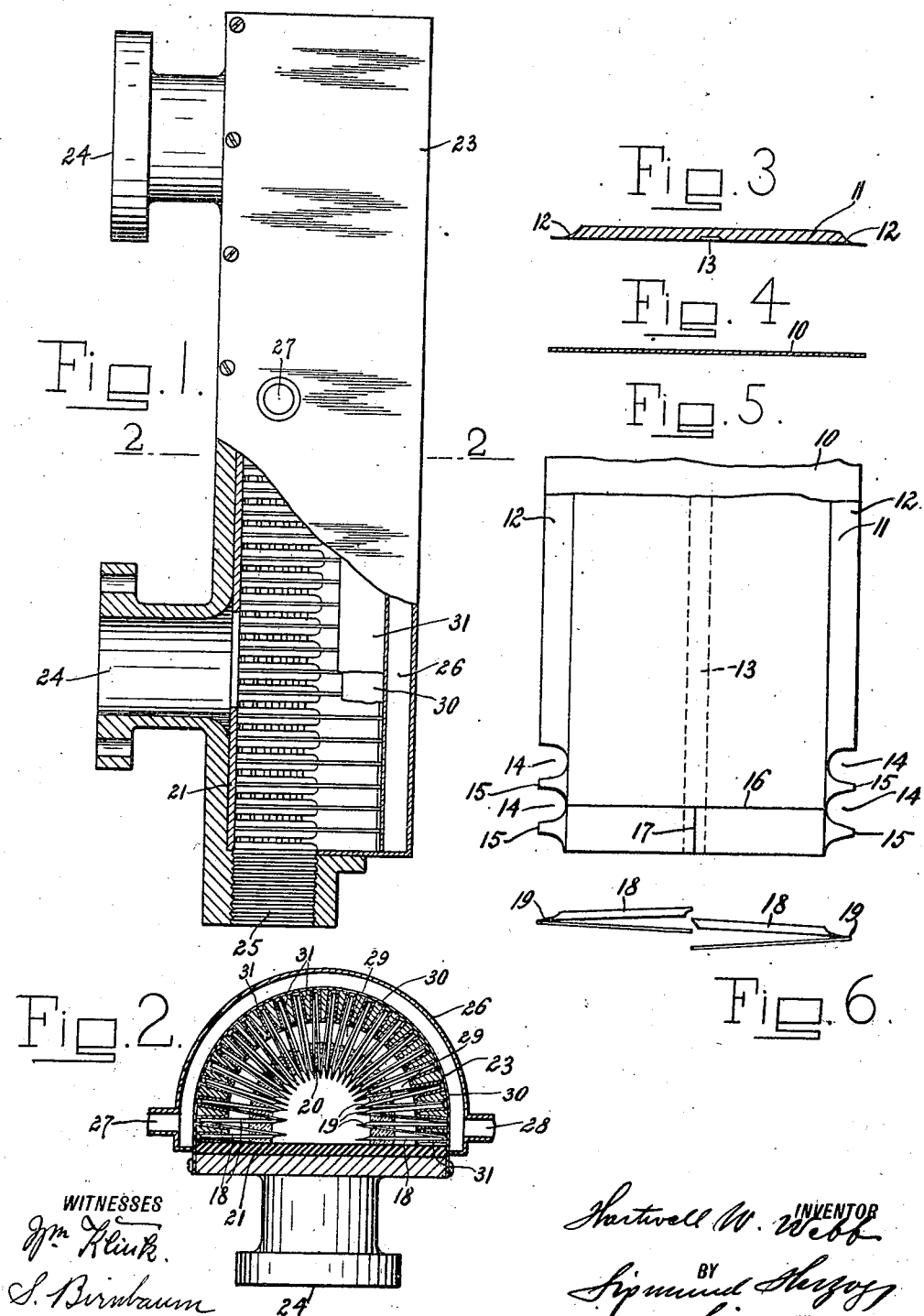

1,234,515.

Patented July 24, 1917
3 SHEETS—SHEET 2.

WITNESSES

INVENTOR
Hartwell W. Webb
BY
his ATTORNEY

H. W. WEBB.
THERMO-ELECTRIC GENERATOR.
APPLICATION FILED MAY 17, 1913.
1,234,515.
Patented July 24, 1917.
3 SHEETS—SHEET 3.
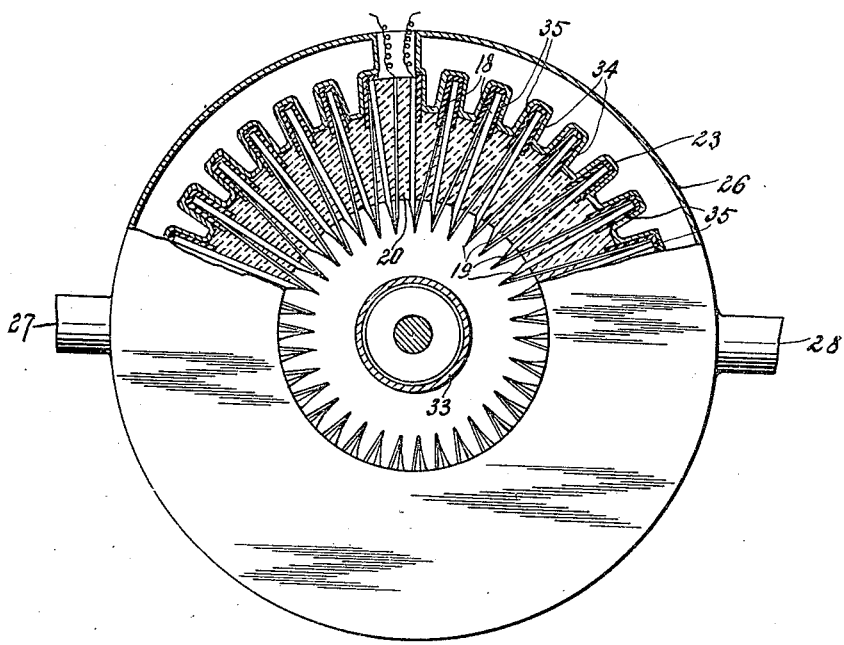
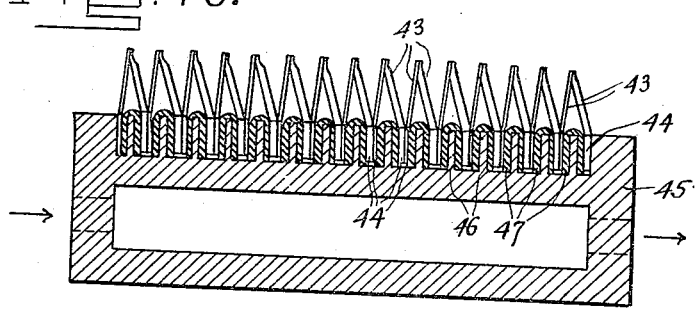
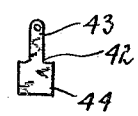
WITNESSES
INVENTOR
Hartwell W. Webb
BY
his ATTORNEY

UNITED STATES PATENT OFFICE.

HARTWELL W. WEBB, OF CRESSKILL, NEW JERSEY.

THERMO-ELECTRIC GENERATOR.

1,234,515. Specification of Letters Patent. Patented July 24, 1917.

Application filed May 17, 1913. Serial No. 768,281.

*To all whom it may concern:*

Be it known that I, HARTWELL W. WEBB, a citizen of the United States, and resident of Cresskill, in the county of Bergen and State of New Jersey, have invented certain new and useful Improvements in Thermo-Electric Generators, of which the following is a specification.

The present invention relates to thermo-electric generators.

Almost all thermo-electric generators which have been devised heretofore have been so inefficient that they cannot compete with other means for the generation of electric current. They have been inefficient for two reasons, more particularly because those joints of the thermo-electric couples which are to be heated were not properly constructed, and the temperature at the joints which are to be cooled could not be reduced to the possible minimum. The heated junctions could not be maintained, therefore, at the highest temperature attainable, and the greatest fall in the thermic potential could not be secured.

One of the objects of the present invention is to obviate these defects in order to increase the efficiency of transformation of energy.

Another object of the invention is to simplify the manufacture of generators of this type, whereby a saving of time and labor is obtained, which obviously results in a reduction of cost in the manufacture thereof.

With these and other objects in view, which will more fully appear as the nature of the invention is better understood, the same consists in the combination, arrangement and construction of parts hereinafter fully described, pointed out in the appended claims and illustrated in the accompanying drawings, it being understood that many changes may be made in the size and proportion of the several parts and details of construction within the scope of the appended claims without departing from the spirit or sacrificing any of the advantages of the invention.

A few of the many possible embodiments of the invention are illustrated in the accompanying drawings, in which:—

Figure 7:
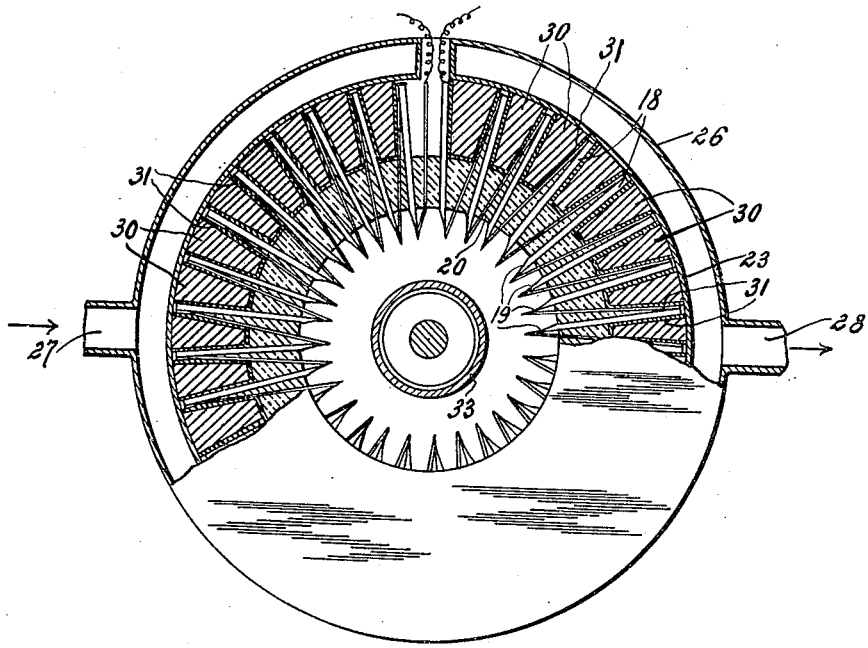
Figure 9:
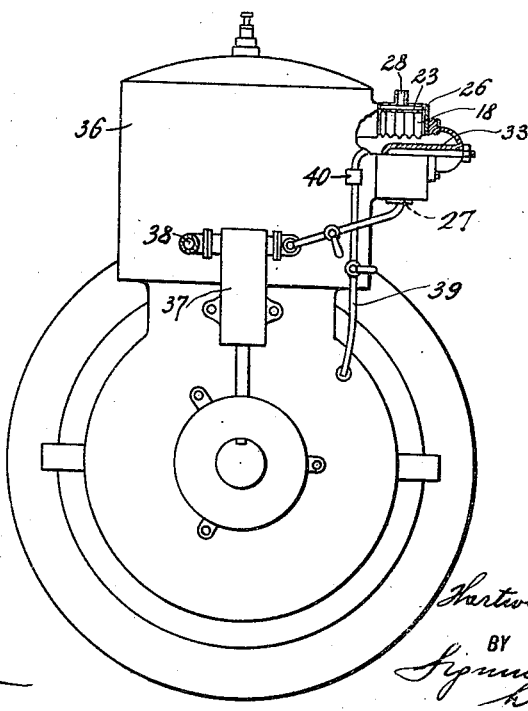

Figure 1 is a front elevation, partly in section, of a generator constructed in accordance with the present invention; Fig. 2 is a section taken on line 2—2 of Fig. 1; Fig. 3 is a section taken through a strip of metal of which one of the elements of the thermo-electric couples is formed; Fig. 4 is a section taken through a strip of which the other element is formed; Fig. 5 is a plan view of said two strips showing the process of manufacture of the thermo-electric couples; Fig. 6 is a front elevation of two finished thermo-electric couples; Fig. 7 is a front elevation, partly in section, of a modified generator; Fig. 8 is a similar view, partly in section, of a further modification of the invention; Fig. 9 is a side elevation of an internal combustion engine with a generator constructed in accordance with the present invention in position thereon; Fig. 10 is a section taken through a further modification of the invention; and Fig. 11 is a side elevation of an element of the thermo-electric couples employed in the device shown in Fig. 10.

In describing the invention, first the process of making the thermo-electric couples will be specified. The generators, forming the subject matter of the present application for Letters Patent, comprise thermo-electric couples having, for instance, strips of iron as their positive elements, and strips of alloy of nickel and copper as their negative elements, which are interfused at their joints by electric welding, more particularly by electric spot welding, in order to reduce the cost of joining. The thermal conductivity of iron being considerably greater than that of the nickel and copper alloy, the iron element is formed of a smaller cross section than the nickel copper element, to compensate for the difference between their unlike thermal conductivities. The same rule must be taken into consideration if other materials are used.

Referring now more particularly to Figs. 3 to 6, inclusive, the numeral 10 indicates a strip of metal, for instance iron, of which the positive elements of the couples are formed, said strip being of a thickness suitable for the purpose and of a width which corresponds to twice the length of an element. The numeral 11 indicates a metallic strip, say for instance an alloy of nickel and copper, of which the negative elements of the couples are to be made. This strip is provided with beveled longitudinal edges 12, and in its underface with a centrally arranged longitudinal groove 13. In forming the couples of these two strips, they are placed on top of each other, and notches 14 provided in their longitudinal edges, for instance by stamping operation. The two strips are then joined by spot welding at their pointed edge sections 15, formed by notching the said strips. After this operation, the strips are cut along transverse line 16, which extend from the central portions of two registering notches to the central portions of two corresponding registering notches formed in said strips. The portions of the strips so obtained are then divided by cutting the same along lines 17, whereby of each of said portions two thermo-electric couples 18, 18 are formed. From an inspection of the drawings it will be observed that each couple is provided with a joint 19, which is greatly and gradually reduced in cross section due to the peculiar design of the notches 14, 14, and to the fact that the longitudinal edges of the strip 11 are beveled. The spot weld is located at the point of minimum cross section. The other ends of the couples 18 are also somewhat reduced in cross section, inasmuch as a groove 13 is produced in the strip 11, as has been above specified.

In constructing a generator of the elements now described, the same are joined to form chains of couples, each chain being held in a horse-shoe like configuration by a binding, heat-conducting and electric insulating material 20, as shown in Figs. 1 and 2 of the drawings. Each of these chains constitutes a unit of the generator. If the generator is to comprise more than one of the units described, such units are juxtaposed and their binding material suitably connected, for instance by cementing, their terminals being then electrically connected in any suitable manner, and the terminals of the entire generator connected to the device, by means of which the electric energy is to be translated. The several units are attached to a base plate 21 of electric insulating material, and the entire generator inclosed by a casing 23, which is provided with inlets 24 and with an outlet 25. The inlets 24 are connected with a suitable source of heat, for instance the exhaust pipe of an internal combustion engine, and the outlet 25 with a pipe that conducts the exhaust gases to the open air. The binding material 20 and the base plate 21 form a compartment, into which the reduced inner ends of the thermo-electric couples project throughout their lengths, portions of the couples being embedded in the said binding material, their outer sections extending beyond the binding material toward the wall of the casing 23, but do not contact therewith. The casing 23 is made of a suitable heat-conducting material, and provided with a cooling jacket 26, having an inlet 27 and an outlet 28. The inlet 27 is connected with the outlet side of a water pump, and the outlet 28 with a waste pipe, or the said inlet and outlet may be in communication with a suitable fluid circulating system.

In forming the generator, corresponding couples of adjoining units are put in alinement with each other, whereby channels 29 are formed, into which are placed bars 30 of heat-conducting material, said bars being electrically insulated from the elements of the couples by an electric insulating and heat-conducting material 31, for instance mica sheets. The bars 30 are shaped in such a manner as to cause the sheets 31 to abut against the elements of the couples, the outer edges of said bars contacting with the inner surface of the walls of the casing 23. By shaping and disposing the bars in this way, a thermal contact is obtained between the surfaces to be cooled and the cooling jacket.

Considering the operation of the device shown in Figs. 1 and 2, it is to be observed that the inner reduced ends of the elements are exposed throughout their lengths to the heat of the products of combustion passing through the compartment, formed in the casing 23. Inasmuch as the junctions which are exposed to the heat are greatly reduced in size compared with the body portions of the elements, the said junctions will be maintained at the highest temperature attainable. It is well known that the highest electromotive force is set up in a thermo-electric battery when the fall in the thermic potential between the heated and the cooling junctions is the greatest possible. Since a thermal contact exists between the cooling junctions and the water-jacket, the heat is effectively carried away from these junctions and the fall in the thermic potential is obviously the greatest possible, thus increasing the efficiency of the transformation of energy.

A modification of the invention is illustrated in Fig. 7 of the drawings which differs from the one hereinabove described in that the units of the generator are held by the binding, heat-conducting electric-insulating material 20 in a star-like configuration, the binding material forming a ring-like structure in which portions of the elements of the generator are embedded, their reduced ends and their outer ends projecting beyond the same. The casing 23 is obviously in this case cylindrical, the water-jacket 26 being annular. Within the compartment formed by the binding material 20 is centrally located a baffle cylinder 33 of a suitable refractory material. The baffle serves to deflect the products of combustion, for instance the exhaust gases, to the heated junctions of the thermo-electric couples.

A further modification of the device is illustrated in Fig. 8 of the drawings, differing from the one shown in Fig. 7, in that the wall of the inclosing casing 23 is corrugated, as clearly shown at 34, 34. The corrugations are lined with electric insulating strips 35, which are of heat-conducting material, the outer joints, that is to say the cooled joints of the couples being arranged within the corrugations of the casing in such a manner that they with the lining strips 35 fully fill the said corrugations, with the result that they are in thermal contact with the casing.

The device illustrated in Fig. 8 of the drawings is shown mounted upon an internal combustion engine, said engine being denoted by the numeral 36, the exhaust gases being discharged into the cylindrical compartment formed by the binding material, and leaving the same through an outlet (not shown in the drawings). The inlet 27 to the water-jacket 26 is connected with the outlet side of a pump 37, which is actuated by the engine, its inlet side 38 being in communication with a water tank or other supply. A pipe 39 connects the compression chamber of the engine, in this case the crank case, with the cylindrical compartment in which the junctions receive heat, in said pipe being inserted a check valve 40, which opens toward the crank case. Through this pipe a small quantity of combustible mixture is forced on each downward stroke of the piston in the engine cylinder into the said compartment, and ignited therein by the exhaust gases passing through the same. An efficient cooling of the outer junctions of the thermo-electric couples is obtained, inasmuch as the said junctions are in a good thermal contact with the cooling liquid. Experiments have shown that the temperature of the cooling fluid in the jacket makes very little difference in the voltage of the set, inasmuch as the amount of heat absorbed by the jacket is increased by the increased flow of water when the heat of the engine exhaust is increased by the speeding of the engine, and as the temperature of the water in the jacket rises, the temperature of the heated junctions rises to nearly the same proportion, maintaining thereby approximately the same temperature difference and voltage of thermo-electric units. For this reason the elements of the couples may be of comparatively short lengths, such construction lessening the internal resistance and increasing accordingly the efficiency of the device. It has been found that in a structure built according to this invention the cooling ends are reduced in temperature to about 50° above that of the water in the jacket. On account of the low mean temperature at which the generator is operating, metals having a high temperature coefficient of resistance, such as iron, may be employed without causing material variation in the internal resistance of the generator under wide variations in the heat of the exhaust gases.

A still further modification of the invention is shown in Figs. 10 and 11 of the drawings, differing from the other types hereinbefore described in that the elements of its thermo-electric couples, which are denoted by the numeral 42, are of minimum lengths, their reduced ends 43 being wholly exposed to the hot gases and their enlarged portions 44 are throughout their lengths in good thermal contact with the metallic cooling jacket or casing 45. This casing is provided with a plurality of longitudinal channels 46, which are lined with electric insulating strips 47, for instance mica sheets, which are good heat conductors. The outer joints of the couples, that is to say the portions to be cooled, are arranged within the channels of the casing so that they with the lining strips fully fill the said channels, with the result that they are in good thermal contact with the casing.

This construction gives a thermal and electric gradient of maximum pitch, and is obviously most economical of active metal and so also of space, compared with the types hereinbefore disclosed. It is preferably made use of where a supply of gas of high thermal potential or of high velocity is available in connection with an adequate supply of cooling fluid. It is to be noted that instead of water cooling air cooling may be employed. In the latter case, of course, the casing is provided with fins against which a blast of cool air is directed.

The type of construction shown in Figs. 10 and 11 of the drawings requires careful adaptation to the flow of hot gases, since the general law for the heating of metallic bodies by convection from gases requires that not only the maximum number of gas molecules impinge upon the metal, but that the surface exposed to the impact of gas be so arranged that the gas thrown off from the said surface does not impede the impact of fresh oncoming gas and divide with the same the thermal energy it contains. To obviate such defect it has been found that an impact of gas in an oblique direction upon the comb-like heated structure is preferable in a closely spaced arrangement.

What I claim is:—

1. In a thermo-electric generator, the combination with a casing having a cooling jacket, of a heating compartment therein having refractory walls, a plurality of connected thermo-electric couples passing through the walls of said compartment, the inner ends of said couples constituting the joints to be heated and their outer ends the joints to be cooled, heat-conducting and electric insulating material covering said outer ends, and heat-conducting means contacting with said casing and said heat-conducting and electric insulating material.

2. In a thermo-electric generator, the combination with a casing having a cooling jacket, of a heating compartment therein having refractory walls, a plurality of connected thermo-electric couples passing through the walls of said compartment, the inner ends of said couples constituting the joints to be heated and their outer ends the joints to be cooled, heat-conducting and electric insulating material covering said outer ends, heat-conducting means contacting with said casing and said heat-conducting and electric insulating material, and a baffle in said compartment for directing the stream of hot gases passing therethrough to the joints to be heated.

Signed at New York, in the county of New York and State of New York, this 16th day of May, A. D. 1913.

HARTWELL W. WEBB.

Witnesses:
SIGMUND HERZOG,
S. BIRNBAUM.